United States Patent [19]
Haller et al.

[11] Patent Number: 5,963,011
[45] Date of Patent: Oct. 5, 1999

[54] SYSTEM WITH INTERCHANGEABLE BATTERY AND TWO CHARGERS

[75] Inventors: Ulrich Haller, Stuttgart; Robert Eberle, Nürtingen, both of Germany

[73] Assignee: Metabowerke GmbH & Co., Germany

[21] Appl. No.: 08/983,327

[22] PCT Filed: May 24, 1996

[86] PCT No.: PCT/EP96/02248

§ 371 Date: Apr. 24, 1998

§ 102(e) Date: Apr. 24, 1998

[87] PCT Pub. No.: WO97/05684

PCT Pub. Date: Feb. 13, 1997

[30]   Foreign Application Priority Data

Jul. 26, 1995  [DE]   Germany .......................... 195 27 201

[51] Int. Cl.$^6$ ................................................ H01M 10/46
[52] U.S. Cl. .......................................... 320/106; 320/110
[58] Field of Search .................................... 320/106, 107, 320/110, 111, 112, 113, 114, 115, 138, FOR 101, FOR 114, FOR 155

[56]       References Cited

U.S. PATENT DOCUMENTS 5,229,701  7/1993  Leman et al. .

5,391,972  2/1995  Gardner et al. .

FOREIGN PATENT DOCUMENTS

3325282A1  1/1985  Germany .

OTHER PUBLICATIONS

Patent Abstract of Japan, E–1489, Jan. 13, 1994, vol. 18/No. 20, Rechargeable Battery, 5–258776 (A).

*Primary Examiner*—Edward H. Tso
*Attorney, Agent, or Firm*—Jones, Tullar & Cooper, PC

[57]       ABSTRACT

The present invention relates to an interchangeable battery for a battery-operated electric tool with a contact arrangement which, in order to charge the battery cell or cells by means of a charger having open counter-contacts, has at least a first freely accessible contact area per contact by means of which the battery can be connected to the counter-contact of the charger, the interchangeable battery is constructed according to the invention in such a way that it can also be charged by means of a charger with a screened contact region in that either the contacts of the battery are contact pins or blades which can be inserted into a contact region screened as far as a closely restricted aperture of a charger with screened counter-contacts or the contacts of the battery have a region screened by a wall which has such a wall thickness that the contacts with the entire wall can be inserted into the screened contact region.

12 Claims, 3 Drawing Sheets

SYSTEM WITH INTERCHANGEABLE BATTERY AND TWO CHARGERS

BACKGROUND OF THE INVENTION

The present invention relates to a system consisting of an interchangeable battery for a battery-operated electric tool and two chargers for the interchangeable battery.

Hereinafter, a charger provided with exposed counter-contacts will be called, by way of example, a transformer charger, and a charger provided with shielded counter-contacts will be called, by way of example, a condenser charger.

The charging of interchangeable batteries by means of transformer chargers has the advantage that no substantial precautions are necessary against the unintentional touching of the charger's contacts, since the voltage is reduced to a low level that is not dangerous to humans, i.e. about that of the battery's cell voltage or sum of the cell voltages. On the other hand, the charging circuit of condenser chargers operates at line voltage, which means that according to safety regulations, the contacts of such a charger must be protected against unintentional touching. Due to the large size of condensers, condenser chargers used to require much effort to manufacture and were very expensive. However, in recent times, the development of condensers has progressed so far that there is now an economically feasible interest in using condenser technology when recharging interchangeable batteries.

SUMMARY OF THE INVENTION

It is therefore an object of the present invention to create an interchangeable battery of the type described above, which can be charged either by means of a charger with shielded counter-contacts or by means of a charger with exposed counter-contacts, which the user may already own, and which can be manufactured economically. It is also an object of the present invention to provide for this interchangeable battery an energy charging and storing device consisting of a charger and the above mentioned interchangeable battery, which can also be manufactured economically but meets the applicable safety regulations with regard to shielding the contact surfaces.

According to the present invention, these objects are achieved in an interchangeable battery of the type described above in that the contacts of the battery can be inserted into a screened contact region of the charger, by means of contact reeds, arbors or pins which are shielded except for a closely restricted plug-in aperture, or in that the contacts of the battery are provided with a region defined by a wall which is so thin that the contacts can be plugged-in with the wall into the shielded contact region of the charger named last.

An interchangeable battery designed in such a way can be charged either by means of a transformer charger with exposed counter-contacts or by means of a condenser charger with shielded counter-contacts. In the first case, the freely accessible contact surface of the contacts of the interchangeable battery adjoins the exposed counter-contacts of the transformer charger. In the second case, the contact arrangement of the interchangeable battery is plugged into the plug-in apertures of the shielded contact area of the condenser charger. Since the contacts of a condenser charger are under Hue voltage, i.e. for example 230 Volts, the contact region must be shielded in such a way that the unintentional touching of the contacts, in particular by children, is not possible. According to the security regulation presently in effect, the plug-in apertures for the contacts of the interchangeable battery must have a clear cross-section of no more than 3 mm. If the contacts of the interchangeable battery according to the present invention are designed in the form of contact reeds, arbors or pins protruding from a surface, they can be plugged into the plug-in apertures into the shielded contact region of a condenser charger and brought into contact with the counter contacts of the charger. If the contacts of the interchangeable battery are provided with a region adjoining a wall or shielded by this wall by which they may, for example, be held as is the case with interchangeable batteries meant to be used with transformer chargers, this wall according to the present invention is so thin that the contact arrangement can be plugged into the plug-in apertures of a charger with a shielded contact region.

According to a preferred embodiment of the present invention, the contacts of the interchangeable battery are provided with a second contact surface extending perpendicular to the first contact surface, by which they can be brought in contact with the counter-contacts of a charger which are protected against being touched. In this interchangeable battery according to the present invention, the second contact surface preferably extends mainly horizontally away from the first contact surface and forms the "active" contact surface when charged by means of a condenser charger. Because the first contact surface of the battery contacts extends in the same place or in the same plane as a housing or contact foot of the battery, as is the case in a known interchangeable battery provided with a transformer charger, the interchangeable battery according to the present invention can be used either in connection with the known transformer charger or in connection with condenser chargers.

In a preferred embodiment of the interchangeable battery, the contacts are provided with a narrow side and a broad side, whereby the narrow side forms the first contact surface and the broad side the second contact surface, although this is not absolutely necessary.

Advantageously, an interchangeable battery according to the present invention is provided with a contact foot that carries the contact arrangement and can be positively plugged into a receptacle of a charger. This contact foot is preferably provided with a front circumferential wall that protects the contacts in the radial direction against mechanical action. It has also been recommended to separate the contacts from each other by means of an insulating wall, to ensure that short-circuiting or the flashover of sparks is prevented.

A known energy charging and storage device comprises either a charger with exposed contacts in connection with a known interchangeable battery or a charger with shielded counter-contacts and an interchangeable battery which, however, cannot be charged by means of a charger provided with exposed counter-contacts.

An energy charging and storage device according to the present invention of the type described above comprises an interchangeable battery according to the present invention and a charger for the interchangeable battery, and is characterized in that the charger is provided with a shielded contact region protected against being touched, with plug-in apertures for the contacts of the interchangeable battery.

In the energy charging and storage device according to the present invention, the battery contacts can be plugged-in with the adjoining wall, if provided, into the plug-in apertures of the charger. To ensure safe contacting, the counter contacts of the charger can be designed to be elastic; for the bilateral contacting of the contacts of the interchangeable battery, the counter contacts of the charger form a receptacle slot for the battery contacts, which are preferably reed-like. In this case, it has been proven advantageous when the counter-contacts are extended in a V-shape so that the contact reeds, which also may be provided with a plug-in bevel, can be brought securely into their predetermined charging position and to prevent them as far as possible from being plugged-in the wrong way.

Other characteristics, details and advantages of the present invention are defined in the claims and shown in the attached drawings, as well as in the following description of a preferred embodiment of the present invention.

DESCRIPTION OF THE PREFERRED EMBODIMENTS

Figure 1:
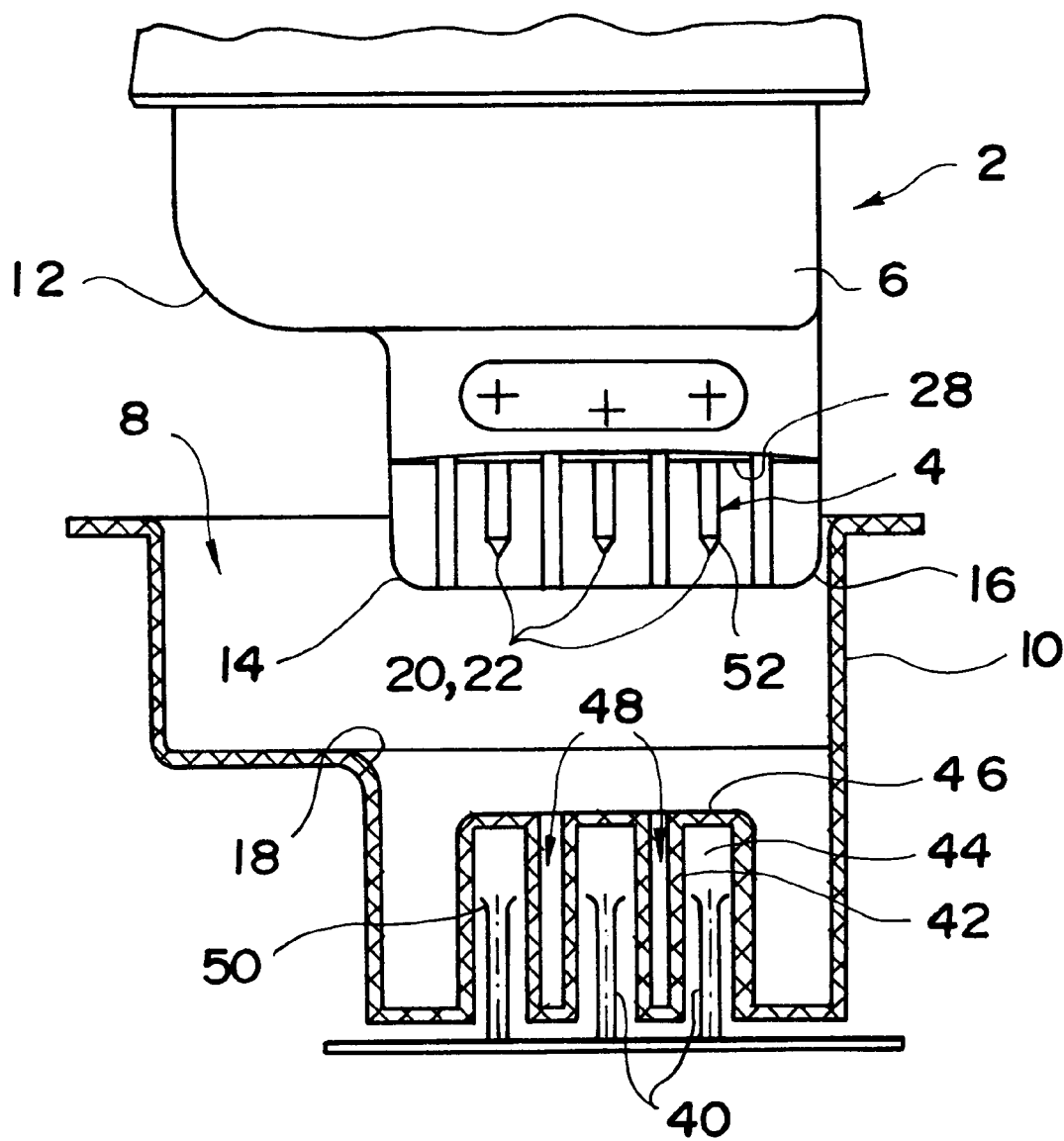
FIG. 1 shows a sectional view of an interchangeable battery and a receptacle shaft of a charger according to the present invention.

FIG. 1 shows an interchangeable battery pack 2 with a contact foot 6 carrying a contact arrangement 4. The interchangeable battery pack 2 can belong to any electric appliance, such as an electric drill, and its contact foot 6 can be plugged into a receptacle shaft 8 of a charger 10 shown only in this area, with shielded counter-contacts, hereinafter called condenser charger. The rounded areas 12, 14, 16 of contact foot 6 as well as a rounded edge area 18 of receptacle shaft 8 function as centering and guiding means.

Figure 2:
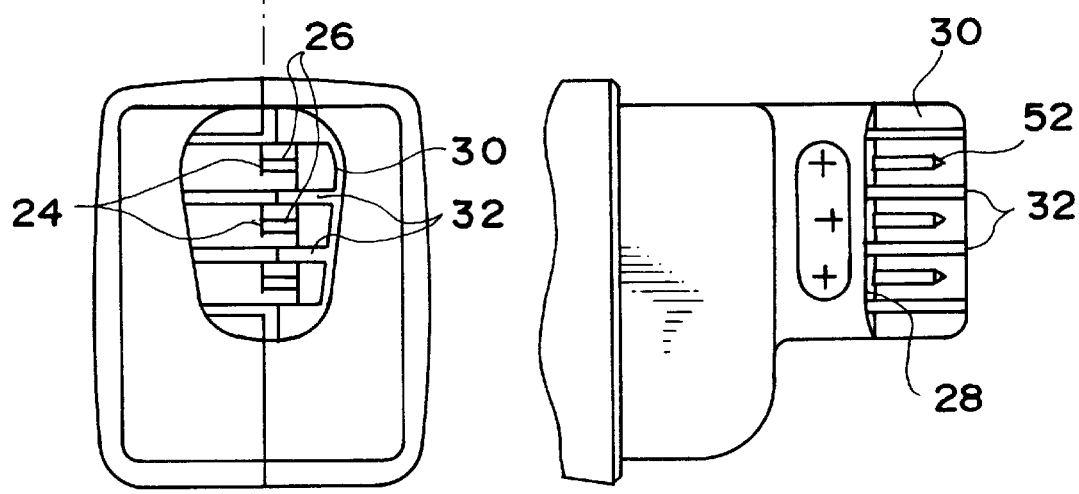
FIG. 2 shows a bottom and side view of a contact arrangement of the interchangeable battery according to the present invention.

The contacts 20 of the interchangeable battery pack are designed in the shape of contact reeds 22 which have a narrow side 24 and a broad side 26, as shown in FIG. 2. The contact reeds 22 protrude from an end surface region 28 of contact foot 6 and are protected against mechanical action in the radial direction by circumferential walls 30 which extend in the direction in which contact foot 6 is plugged-in. Furthermore, the contact reeds 22 are separated from each other by insulating walls 32 extending between them.

Figure 3:
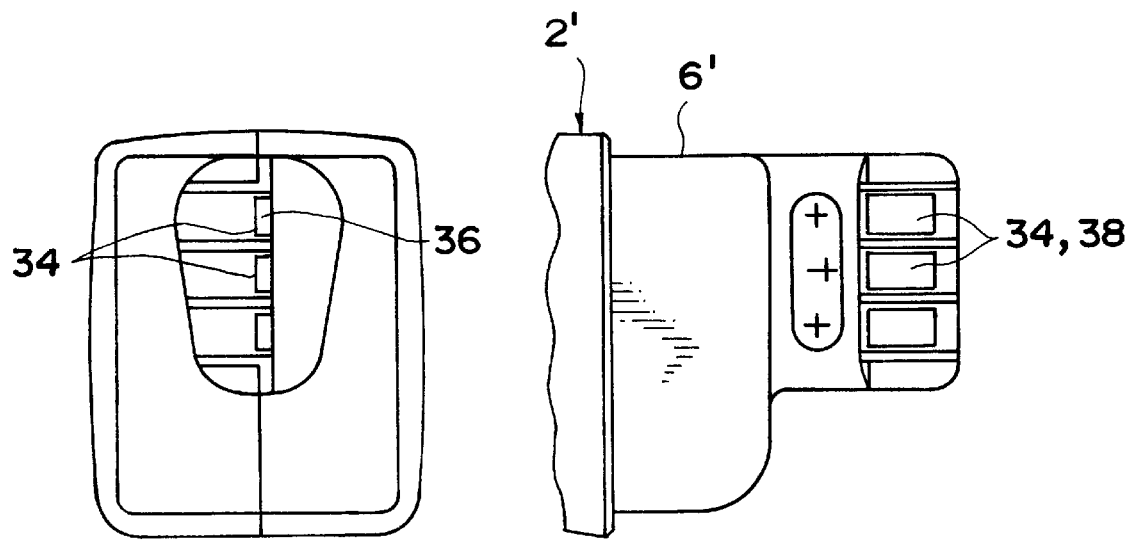
FIG. 3 shows the known contact arrangement of an interchangeable battery in the views according to FIG. 2.

In relation to contact foot 6, the narrow sides 24 of the three contact reeds 22 extend in the same plane as contact surfaces 34 of a contact foot 6' designed accordingly of a known interchangeable battery pack 2' for a charger with exposed counter-contacts, hereinafter called a transformer charger, as shown in FIG. 3. The contact surfaces 34 of the known interchangeable battery pack are formed by flat contact plates 38 laid across contact holders 36. The corresponding counter-contacts of a transformer charger, not shown, are exposed, but they pose no danger, since they have only low voltage in the magnitude of the cell voltage or the sum of individual cell voltages. By contrast, the charger circuit of condenser charger 10 (FIG. 1) operates at line voltage, which means that the contacts 40 of charger 10 may have a high voltage, in particular 230 volts. Contacts 40 are therefore arranged at the bottom of the receptacle shaft 8 where they cannot be touched by a user; they are surrounded by insulating walls 42 which form a contact or receptacle region 44 for these contacts 40 and for contact reeds 22 of the interchangeable battery pack 2 which can be plugged into contact regions 44 via the corresponding plug-in slots 46. When contact foot 6 is inserted or plugged into receptacle shaft 8, the insulating and separating walls 32 engage in appropriately shaped recesses 48 between walls 42 and thus ensure exact guidance, so that contact reeds 22 can be passed through the plug-in slots 46.

The counter-contacts 40 of the charger are elastic and form a receptacle slot for contact reeds 22. The ends 50 of contacts 40 are extended in a V-shape, and together with a plug-in bevel 52 at the front end of contact reeds 22, they function as centering means.

Figure 4:
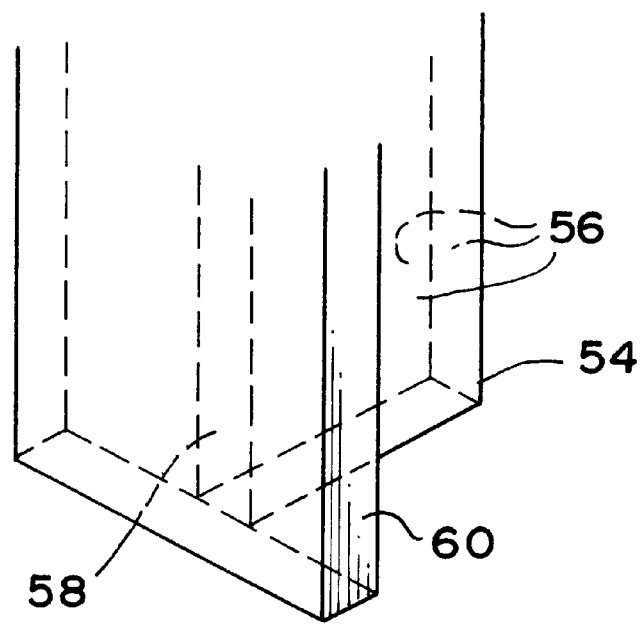
FIG. 4 shows a schematic view of a shielded contact region of a charger according to the present invention and a contact of an interchangeable battery according to the present invention.
Figure 4:
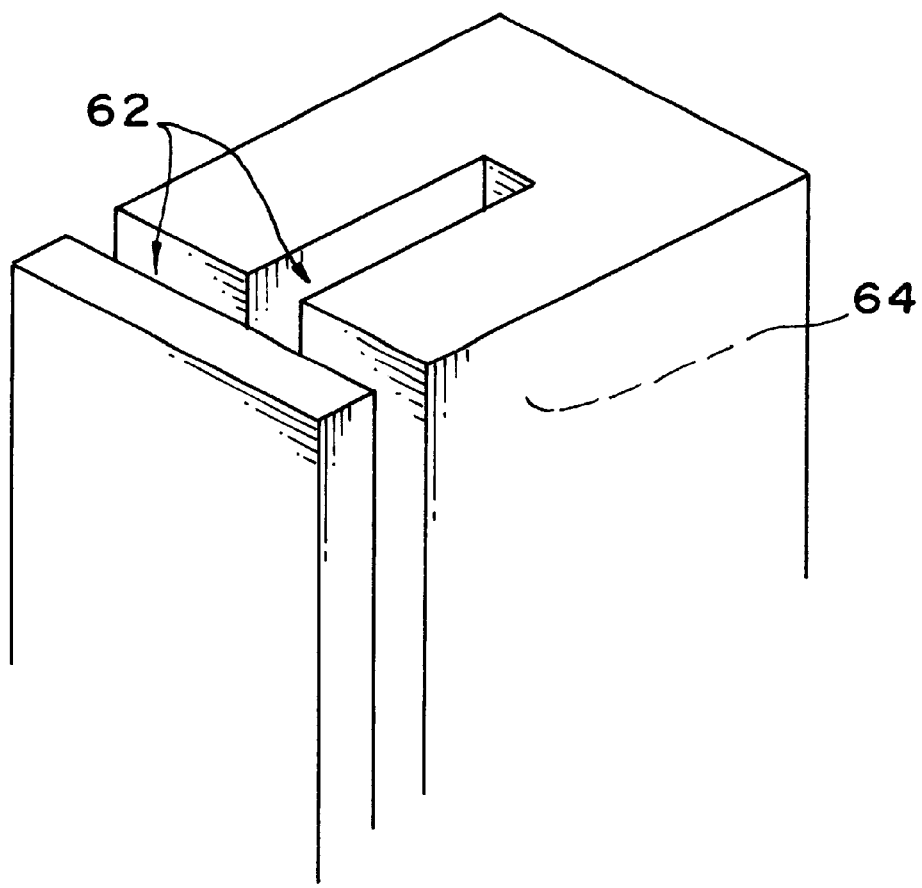

FIG. 4 shows a schematic view of another version of the present invention, according to which the interchangeable battery, of which only the front region of a contact 54 is shown, is provided with several freely accessible contact surfaces 56 and a region 58 that is shielded by an adjacent wall 60. In a projection in the plug-in direction, wall 60 is so thin in accordance with the present invention that contact 54 can be plugged, together with wall 60, into a plug-in aperture 62 (so thin that it meets safety regulations) of a shielded contact region 64 of a condenser charger. According to the safety regulations currently in effect, the slot-like plug-in aperture 62 cannot be larger than 3 mm at its widest point. It is explicitly pointed out that the T-shaped form of the contact configuration shown in the cross-section in FIG. 4 is only one example, and the L-shaped and other forms are also covered by the present invention.

To ensure that contacting is safe, contacts with bead-shaped surfaces are often used as well.

We claim:

1. A system for a battery-operated electric tool, comprising: an interchangeable battery; and two chargers for the interchangeable battery, wherein:

one of said chargers is provided with exposed counter-contacts and the other of said chargers with shielded counter-contacts carrying line voltage said shielded counter-contacts being situated inside of a contact region where they are shielded except for closely restricted plug-in apertures;

said interchangeable battery being provided with a contact arrangement having a first freely accessible contact surface per contact, said contacts of said interchangeable battery consisting of one of contact reeds, arbors and pins which protrude from a surface of said interchangeable battery; and said contacts of said interchangeable battery being arranged so that at least one of said first freely accessible contact surface or a contact surface perpendicular thereto engages a corresponding counter-contact of either one of said chargers so that the interchangeable battery can be charged from either charger.

2. The system as defined in claim 1, wherein said contact arrangement includes contacts having a narrow side and a broad side, whereby said narrow side forms a first contact surface and said broad side forms a second contact surface.

3. The system as defined in claim 1, wherein said interchangeable battery has a contact foot which carries said contact arrangement, and wherein said other charger includes a receptacle shaft into which said contact foot is plugged.

4. The system as defined in claim 3, wherein said contact foot is provided with a front circumferential wall extending in a plug-in direction, said front circumferential wall surrounding said contact arrangement and protects said contact arrangement against mechanical action.

5. The system as defined in claim 1, wherein the contacts of said contact arrangement are separated from each other by an insulating wall.

6. The system as defined in claim 1, wherein the contacts of said contact arrangement are provided with a plug-in bevel at their front end.

7. A system for a battery-operated electric tool, comprising: an interchangeable battery; and two chargers for the interchangeable battery, wherein:

one of said chargers is provided with exposed counter-contacts and the other of said chargers with shielded counter-contacts carrying line current said shielded counter-contacts being situated inside of a contact region where they are shielded except for closely restricted plug-in apertures;

said interchangeable battery being provided with a contact arrangement having a first freely accessible contact surface per contact, said contacts of said interchangeable battery being provided with at least one region shielded by at least one wall, and said wall is sufficiently thin that said contacts can be plugged into said contact region; and said contacts of said interchangeable battery being arranged so that at least one of said first freely accessible contact surface or a contact surface perpendicular thereto engages a corresponding counter-contact of either one of said chargers so that the interchangeable battery can be charged from either charger.

8. The system as defined in claim 7, wherein said contact arrangement includes contacts having a narrow side and a broad side, whereby said narrow side forms a first contact surface and said broad side forms a second contact surface.

9. The system as defined in claim 7, wherein said interchangeable battery has a contact foot which carries said contact arrangement, and wherein said other charger includes a receptacle shaft into which said contact foot is plugged.

10. The system as defined in claim 9, wherein said contact foot is provided with a front circumferential wall extending in a plug-in direction, said front circumferential wall surrounding said contact arrangement and protects said contact arrangement against mechanical action.

11. The system as defined in claim 7, wherein the contacts of said contact arrangement are separated from each other by an insulating wall.

12. The system as defined in claim 7, wherein the contacts of said contact arrangement are provided with a plug-in bevel at their front end.

* * * * *